United States Patent
Ropers

(10) Patent No.: US 12,470,846 B1
(45) Date of Patent: Nov. 11, 2025

(54) NOISE REDUCTION METHOD FOR VERY LOW LIGHT LEVEL NIGHT VISION

(71) Applicant: Rockwell Collins, Inc., Cedar Rapids, IA (US)

(72) Inventor: Michael A. Ropers, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 71 days.

(21) Appl. No.: 18/661,053

(22) Filed: May 10, 2024

(51) Int. Cl.
*H04N 25/60* (2023.01)
*H04N 23/80* (2023.01)

(52) U.S. Cl.
CPC ............. *H04N 25/60* (2023.01); *H04N 23/80* (2023.01)

(58) Field of Classification Search
CPC ............................... H04N 25/60; H04N 23/80
See application file for complete search history.

(56) References Cited

U.S. PATENT DOCUMENTS

| | | | |
|---|---|---|---|
| 8,229,245 B2 | 7/2012 | Mallat et al. | |
| 8,687,907 B2 | 4/2014 | Toyoda et al. | |
| 9,438,930 B2 | 9/2016 | Milstein | |
| 10,643,309 B2 | 5/2020 | Adler-Golden | |
| 12,356,093 B2* | 7/2025 | Feng | H04N 25/77 |
| 2003/0161531 A1* | 8/2003 | De Grandi | G06V 10/30 382/173 |
| 2008/0013846 A1* | 1/2008 | Fukuhara | G06F 17/148 375/E7.101 |
| 2013/0100262 A1 | 4/2013 | Reymond | |
| 2020/0326414 A1* | 10/2020 | Delic | G01S 17/894 |
| 2022/0120610 A1* | 4/2022 | Numata | H04N 25/773 |
| 2024/0397234 A1* | 11/2024 | Takatsuka | H04N 25/773 |

FOREIGN PATENT DOCUMENTS

CN 107783273 A 3/2018

* cited by examiner

*Primary Examiner* — Christopher K Peterson
(74) *Attorney, Agent, or Firm* — Suiter Swantz IP

(57) ABSTRACT

A system and method for reducing frame-to-frame variations at the pixel level during noise reduction includes determining the noise source and the magnitude of those sources in the system. Once the system noise is characterized a selection of filters can be tailored to target the noise present in the system. The large temporal spikes, or impulse responses, in pixel value are considered to be discrete photon events. The system identifies pixels that have recently received a photon, preserving what little signal is present, while also suppressing Gaussian dark noise. The system implements a multi-level temporal wavelet filter.

20 Claims, 4 Drawing Sheets

NOISE REDUCTION METHOD FOR VERY LOW LIGHT LEVEL NIGHT VISION

GOVERNMENT LICENSE RIGHTS

The U.S. Government has a paid-up license in this invention and the right in limited circumstances to require the patent owner to license others on reasonable terms as provided by the terms of N00421-19-c-0038 awarded by the United States Navy.

BACKGROUND

Digital night vision systems use low light sensors to image scenes under low light conditions and have requirements to meet or exceed night vision goggle performance. Low light conditions present a challenge to meeting these requirements due to poor signal-to-noise ratios in low light scenes resulting in very noisy imagery. As light level decreases, the statistics of the noise shift from Gaussian to Poisson distributed, which reduces the effectiveness of traditional noise reduction techniques.

Gaussian noise is defined by noise with a probability density function matching a normal distribution. Sources of Gaussian noise in imagery include electronic sources, such as amplifiers, temperature induced effects, and limitations caused from limited light levels. Common methods for reducing gaussian noise include spatial filtering through convolution and temporal filtering.

Poisson noise, also known as shot noise, is due to the discrete quantized nature of electric charge and the particle nature of light. As light level is constrained and the likelihood of digitizing a photon over a single frame is reduced, the overall distribution of the noise transitions from Gaussian into Poisson.

The noise characteristics of low light sensors, such as Electron Bombarded Active Pixel Sensors (EBAPS), are a combination of the photoelectron conversion process of the front end and the electronic characteristics of the silicon sensor. The silicon sensor and readout electronics structure create temporally consistent spatial noise due to differences in material characteristics known as fixed pattern noise or periodic noise. Fixed pattern noise are noise patterns that show a repetitive structure either spatially or temporally, and is usually generated from electronics driven by or interfering with frequency dependent sources. A strong spatial fixed pattern noise can be seen in dark or very low light imagery. In contrast to fixed pattern noise, temporal noise consists of differences in pixel values from frame to frame.

SUMMARY

In one aspect, embodiments of the inventive concepts disclosed herein are directed to a system and method for reducing frame-to-frame variations at the pixel level during noise reduction. Optimal reduction of noise requires an understanding the noise source and the magnitude of those sources in the system. Once the system noise is characterized a selection of filters can be tailored to target the noise present in the system.

Under low-light conditions, large temporal spikes, or impulse responses, in pixel value are considered to be discrete photon events. The system identifies pixels that have recently received a photon, preserving what little signal is present, while also suppressing Gaussian dark noise.

In a further aspect, the system implements a multi-level temporal wavelet filter.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
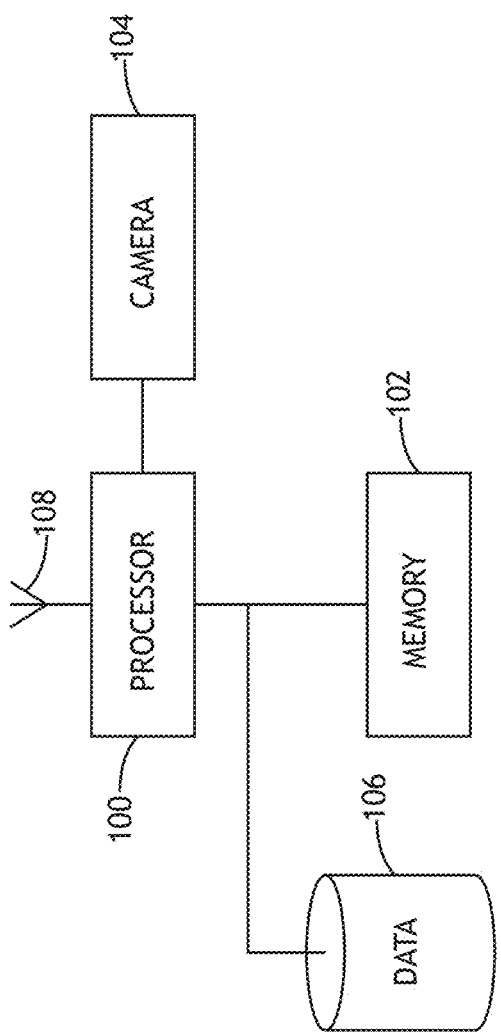
FIG. 1 shows a block diagram of a system suitable for implementing exemplary embodiments.

Before explaining various embodiments of the inventive concepts disclosed herein in detail, it is to be understood that the inventive concepts are not limited in their application to the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of a feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Also, while various components may be depicted as being connected directly, direct connection is not a requirement. Components may be in data communication with intervening components that are not illustrated or described.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in at least one embodiment" in the specification does not necessarily refer to the same embodiment. Embodiments of the inventive concepts disclosed may include one or more of the features expressly described or inherently present herein, or any combination or sub-combination of two or more such features.

Broadly, embodiments of the inventive concepts disclosed herein are directed to a system and method for reducing frame-to-frame variations at the pixel level during noise reduction. Optimal reduction of noise requires an understanding the noise sources and the magnitude of those sources in the system. Once the system noise is characterized a selection of filters can be tailored to target the noise present in the system. The system and method described herein considers large temporal spikes, or impulse responses, in pixel values under low-light conditions to be discrete photon events.

The implemented filter identifies pixels that have recently received a photon, preserving what little signal is present, while also suppressing the gaussian dark noise. The solution must also be effective as signals transition out of the Poisson or shot noise limited levels without creating distracting artifacts. One embodiment for implementing these desired features, while limiting the system resources, is a multi-level temporal wavelet filter.

This noise reduction filter is based on well-known temporal wavelet filtering techniques. The process exploits a property of the wavelet transform that can delay the output of the inverse wavelet transform in time, depending on how the inverse wavelet transform is formulated. A threshold is used to determine when the filter is operating in a very low light scene or higher light scene. Under very low light scenes, the inverse wavelet transform is altered to latch the output of those pixels where a discrete photon is detected. The pixel latch effectively extends the integration time, but only for those pixels where photons are detected, which increases overall signal-to-noise ratio for the low light scene.

Analogous to the Fourier transform, which decomposes a signal into sines and cosines, the wavelet transform decomposes a signal into coefficients for a set of wavelet basis functions. A wavelet is a wave like oscillation that is localized in time that consists of the two basic properties of scale and location.

Transforming a signal into a set of wavelet coefficients is useful as the statistical behavior of noise in the wavelet domain is different from the signal domain. By filtering the transformed signal and then reversing the process specific types of noise can be targeted efficiently and effectively.

Referring to FIG. 1, a block diagram of a system suitable for implementing exemplary embodiments is shown. The system includes a processor 100, memory 102 connected to the processor 100 for embodying nontransitory processor executable code, and at least one camera 104 in data communication with the processor 100 to receive an image stream. The processor 100 is configured via the nontransitory processor executable code to receive image streams from the at least one camera 104 and perform processing steps as described herein.

In at least one embodiment, the processor 100 may store images, image processing parameters, or the like, in a data storage element 106. Furthermore, processed images or image parameters may be shared via a data communication element 108 in data communication with the processor 100.

Figure 2:
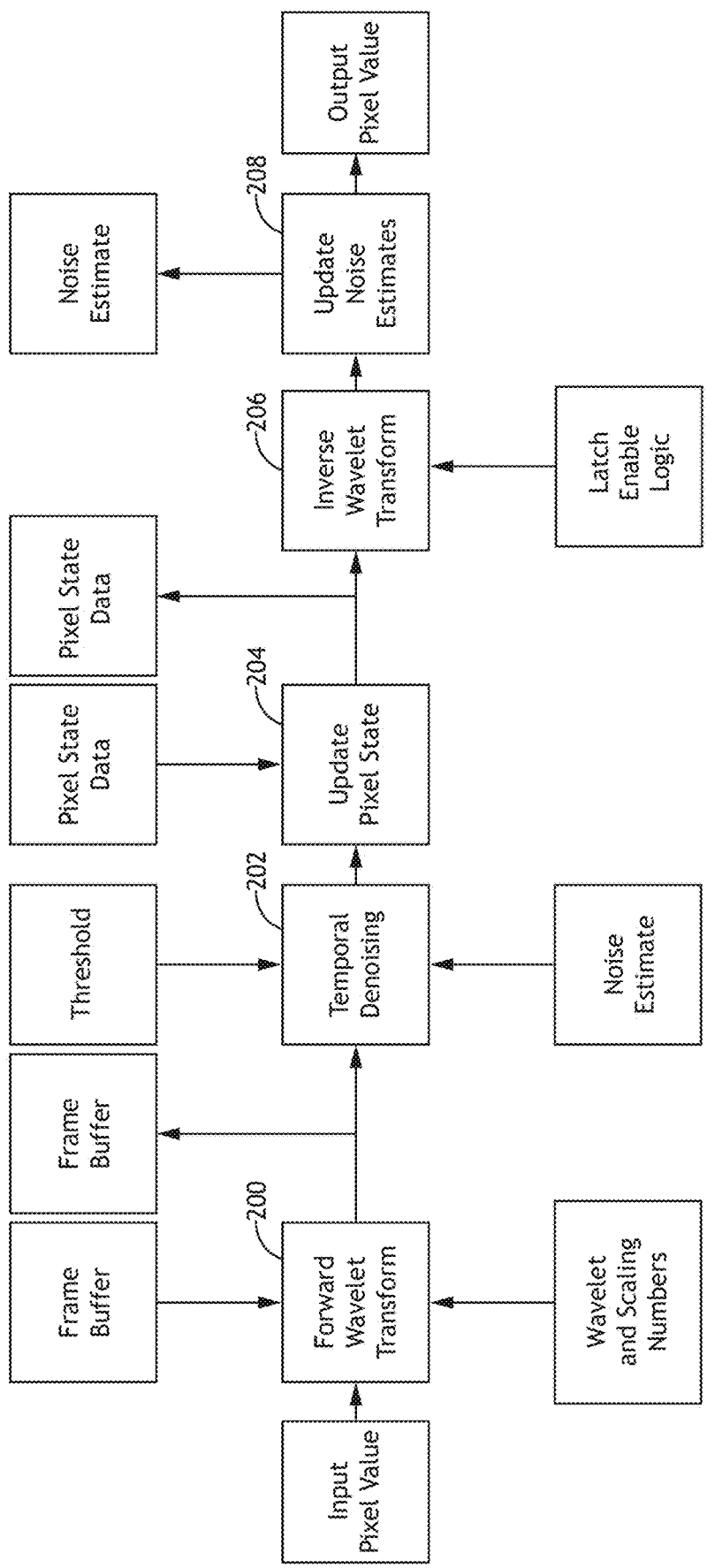
FIG. 2 shows a flowchart of a method according to an exemplary embodiment.

Referring to FIG. 2, a flowchart of a method according to an exemplary embodiment is shown. In a denoising processor, the system performs a forward wavelet transformation 200. Incoming pixels to the noise reduction block, $f_{n\ x,y}$ have been through some processing scheme to reduce or eliminate fixed pattern noise and handle bad pixels. Such scheme may include, but is not limited to, non-uniformity correction, linearization, and bad pixel replacement. Before the forward transform can be calculated, the previously buffered frame values, $f_{n-1\ x,y}$ need to be read. For the initial condition where no previous frame data exist, the current frame is buffered for use on the next frame and returned as an output.

In at least one exemplary embodiment, with the previous frame data read, the first step is to calculate the forward wavelet transformation 200 for each pixel x,y in the image. This calculation is a two-step process which results in both the level one approximation signal, $a1_{x,y}$, and the level one detail signal, $d1_{x,y}$.

$$a1_{x,y} = f_{n-1\ x,y} * \phi(1) + f_{n\ x,y} * \phi(2)$$

$$d1_{x,y} = f_{n-1\ x,y} * \phi(1) + f_{n\ x,y} * \psi(2)$$

Where $\psi$ and $\phi$ are the Harr wavelet and scaling numbers, respectively:

$$\psi(1) = 1/\sqrt{2}$$

$$\psi(2) = (-1)/\sqrt{2}$$

$$\phi(1) = 1/\sqrt{2}$$

$$\phi(2) = 1/\sqrt{2}$$

And $f_{n-1\ x,y}$ and $f_{n\ x,y}$ are the previous and current frame pixel values, respectively:

$f_{n-1\ x,y}$ are the previous frame (n−1) incoming pixel values as read from memory.

$f_{n\ x,y}$ are the current frame (n) incoming pixel values.

After $a1_{x,y}$ and $d1_{x,y}$ have been calculated, the frame buffer values $f_{n-1\ x,y}$ are overwritten with the current frame values $f_{n\ x,y}$ for use when calculating the next frame.

In an exemplary embodiment, an approximation signal $a1_{x,y}$ is a scaled version of the signal of interest, except for photon impulse events that show up in the detail signal $d1_{x,y}$ as high frequency content. The method of determining which pixels in the detail signal $d1_{x,y}$ are treated as impulses is defined through the pixel latch functionality described herein.

The system performs temporal denoising 202. The goal of temporal denoising 202 is to improve the signal-to-noise ratio of the system, primarily targeting performance while operating in low light environments. The implementation of the wavelet filter works to improve the signal-to-noise ratio of the system through two separate methods: thresholding of the detail signal, and implementation of a pixel latch in the inverse wavelet transform 206. In standard wavelet denoising, the purpose of thresholding the detail signal is to determine which pixels have high temporal frequency content that may be a signal as opposed to noise. If a pixel in the detail signal exceeds the noise threshold, it is considered to contain signal and is retained. If a pixel in the detail signal does not exceed the noise threshold, it is considered to contain only noise and those detail coefficients are set to zero. The pixel state update 204 process is designed to detect single photon events under very low light conditions and improve signal-to-noise ratio by retaining the detected signal in the output of the inverse wavelet transform 206 for at least one additional frame.

Before applying filtering to the wavelet domain approximation and detail signals, a threshold value must first be calculated:

$$noiseThresh_{x,y} = noiseEstPrev_{x,y} * noiseThreshScale$$

Where:
noiseEstPrev$_{x,y}$ are the previously calculated noise estimates read from memory for each pixel x,y.
noiseThreshScale is a configurable variable.
noiseThresh$_{x,y}$ are the thresholds used in the current frame for each pixel x,y.

The purpose of the noiseThresh$_{x,y}$ values are to establish which pixels have sufficient signal in the detail signal that filtering should be applied. Thresholding of the detail signal is accomplished by:

$$\widetilde{d1_{x,y}} = \begin{cases} d1_{x,y}, & |d1_{x,y}| \geq noiseThresh_{x,y} \\ 0, & \text{otherwise} \end{cases}$$

Where:
$d1_{x,y}$ is the detail signal calculated in 200 for pixel x,y
$\widetilde{d1_{x,y}}$ is the denoised detail signal for each pixel x,y in the wavelet domain.

Prior to performing the inverse wavelet transformation 206, the state variables for each pixel x,y are first updated during a pixel state update process 204. Each pixel has a total of four states. In one specific implementation, two bits are used to track the current state of the pixel. The pixel states may be NORMAL, a default state where the detail signal $d1_{x,y}$ for that pixel does not exceed a noise threshold; RESET_LO, where the detail signal $d1_{x,y}$ for that pixel has first exceeded a negative noise value threshold ($\widetilde{d1_{x,y}} < 0$); RESET_HI, where the detail signal $d1_{x,y}$ for that pixel has first exceeded a positive noise value threshold ($\widetilde{d1_{x,y}} > 0$); and LATCH, where the LATCH state indicates a discrete photon event has been detected and may be used to introduce a delay in the output of the inverse wavelet transform 206. In at least one embodiment, the LATCH state is entered when the detail signal $d1_{x,y}$ for that pixel first exceeded a negative noise value threshold on the previous frame ($\widetilde{d1_{x,y}} \leq 0$), followed by exceeding a positive noise value threshold on the current frame ($\widetilde{d1_{x,y}} > 0$). Other embodiments using different wavelet and scaling numbers in the forward wavelet transform 200 may use alternate criteria to detect discrete photon events and enter the LATCH state during the pixel state update process 204. The states and transitions are more fully described herein.

In at least one embodiment, during inverse wavelet transformation 206, a stream of output pixels is calculated where the output pixel stream, $g_{n\ x,y}$, is calculated with no output delay for each pixel x,y that was not marked as LATCH during the pixel state update process 204:

$$g_{n\ x,y} = a1_{x,y} * \phi(2) + \widetilde{d1_{x,y}} * \psi(2)$$

Where:
$g_{n\ x,y}$ is the output pixel stream for the current frame (n) for pixel x,y
$a1_{x,y}$ is the approximation signal calculated in 200 for pixel x,y $\widetilde{d1_{x,y}}$ is the filtered detail signal calculated in 202 for pixel x,y
$\psi$ and $\phi$ are the Harr wavelet and scaling numbers as before.

Pixels that were marked as LATCH during the pixel state update process 204 are carried forward from the previous frame and the inverse wavelet transform is calculated with at least a one frame delay (longer for embodiments utilizing more frames), latching the detected photon event from the previous frame in the current frame output pixel stream:

$$g_{n\ x,y} = a1_{x,y} * \phi(1) + \widetilde{d1_{x,y}} * \psi(1)$$

The delay only applies to pixels in the LATCH state; the wavelet and scaling numbers, $\psi$ and $\phi$ used in the inverse wavelet transform 206 are altered for pixels in the LATCH state to introduce a delay of one or more frames in the output pixel stream.

In at least one embodiment, the composite output pixel stream from the inverse wavelet transform 206 may be a combination of pixels with no output delay and pixels with a delay of one or more frames, based on the pixel state calculated during the pixel state update process 204:

$$g_{nx,y} = \begin{cases} a1_{x,y} * \phi(1) + \widetilde{d1_{x,y}} * \psi(1), & pixelState_{x,y} = \text{LATCH} \\ a1_{x,y} * \phi(2) + \widetilde{d1_{x,y}} * \psi(2), & \text{otherwise} \end{cases}$$

Where:
$g_{n\ x,y}$ is the output pixel stream for the current frame for pixel x,y
$a1_{x,y}$ is the approximation signal calculated in 200 for pixel x,y $\widetilde{d1_{x,y}}$ is the filtered detail signal calculated in 202 for pixel x,y
pixelState$_{x,y}$ are the pixel states calculated in 204 for each pixel x,y.
$\psi$ and $\phi$ are the Harr wavelet and scaling numbers as before.

In at least one embodiment, some function may be applied to enable the latching mechanism during inverse wavelet transform 206. In one specific embodiment, application of the pixel latch logic is enabled by comparing the spatial image frame mean frameMean to a set of latch thresholds, latchDisable Thresh and latchEnable Thresh. The latch is disabled when frameMean is above the latchDisable Thresh and enabled when the frameMean value is below the latchEnable Thresh value. It may be appreciated that the latchEnable Thresh may be lower than or below the latchDisable Thresh to prevent rapid switching when values are near a threshold to create hysteresis. In at least one embodiment, latching is only enabled at low light levels where Poisson noise dominates, as compared to higher light levels where Gaussian noise dominates.

If the latch is currently disabled and frame mean is below the enable threshold, then the system may enable the latch. If the latch is currently enabled and frame mean is above the disable threshold, then the system may disable the latch. In at least one embodiment, an enable and disable threshold are based on an ambient light level estimated by the spatial frame mean.

The system may produce updated noise estimates 208 for each pixel x,y. The system may update the noise estimates for some or all of the pixels on a given frame. Noise updates may be distributed evenly throughout the frame rather than in blocks to lower peak memory bandwidth requirements. In such embodiments, any given pixel may be updated every other frame.

Only pixels where the detail signal $d1_{x,y}$ exceeds the noise threshold value contain content that is considered to be signal, and noise estimates are only updated for pixels where the detail signal $d1_{x,y}$ falls below the noise threshold value and the pixel state is set to NORMAL during the pixel state update process 204. In at least one embodiment, to calculate the noise estimate, a set of averaging weights, $\alpha$ and $\beta$, are calculated to minimize quick changes from frame to frame in the noise estimate values, where $0<\alpha<1$ and $\beta$ is equal to $1-\alpha$. To reduce computational overhead, a values may be limited to values which are a power of two such that calculations may be implemented through a simple bit shift.

With the averaging weights $\alpha$ and $\beta$, noise estimate values $noiseEst_{x,y}$ can be updated for those pixels x,y where the detail signal $d1_{x,y}$ falls below the noise threshold value and the pixel state is set to NORMAL during the pixel state update process 204. In at least one embodiment, noise estimates may be calculated by treating $|d1_{x,y}|$ as the absolute deviation of an underlying Gaussian noise process and multiplying $|d1_{x,y}|$ by $$\sqrt{\frac{\pi}{2}}$$

to approximate the standard deviation of the assumed underlying Gaussian noise:

$noiseEst_{x,y} =$ $$\begin{cases} \alpha * |d1_{x,y}| * \sqrt{\frac{\pi}{2}} + \beta * noiseEstPrev_{x,y}, & pixelState_{x,y} = \text{NORMAL} \\ noiseEstPrev_{x,y}, & \text{otherwise} \end{cases}$$

Where:
$noiseEstPrev_{x,y}$ are the previously calculated noise estimates read from memory for each pixel x,y.
$d1_{x,y}$ is the detail signal calculated in 200 for pixel x,y
$\alpha$ and $\beta$ are averaging weights for the moving average filter
$pixelState_{x,y}$ are the pixel states calculated in 204 for each pixel x,y.
$noiseEst_{x,y}$ are the updated noise estimates to be used on the next frame.

The new $noiseEst_{x,y}$ values are then recorded in memory and the noise reduction algorithm is complete for the current frame.

For the initial condition where $noiseEstPrev_{x,y}$ has no history, values of $noiseEstPrev_{x,y}$ are set to 0. In at least one embodiment, a is calculated on each frame as the inverse of either a frame count value frameCount or a predefined number of frames noiseAlphaLimit, whichever is smaller. For frameCount values less than noiseAlphaLimit, the system may update $noiseEst_{x,y}$ for all pixels x,y regardless of the value of $|d1_{x,y}|$.

Figure 3:
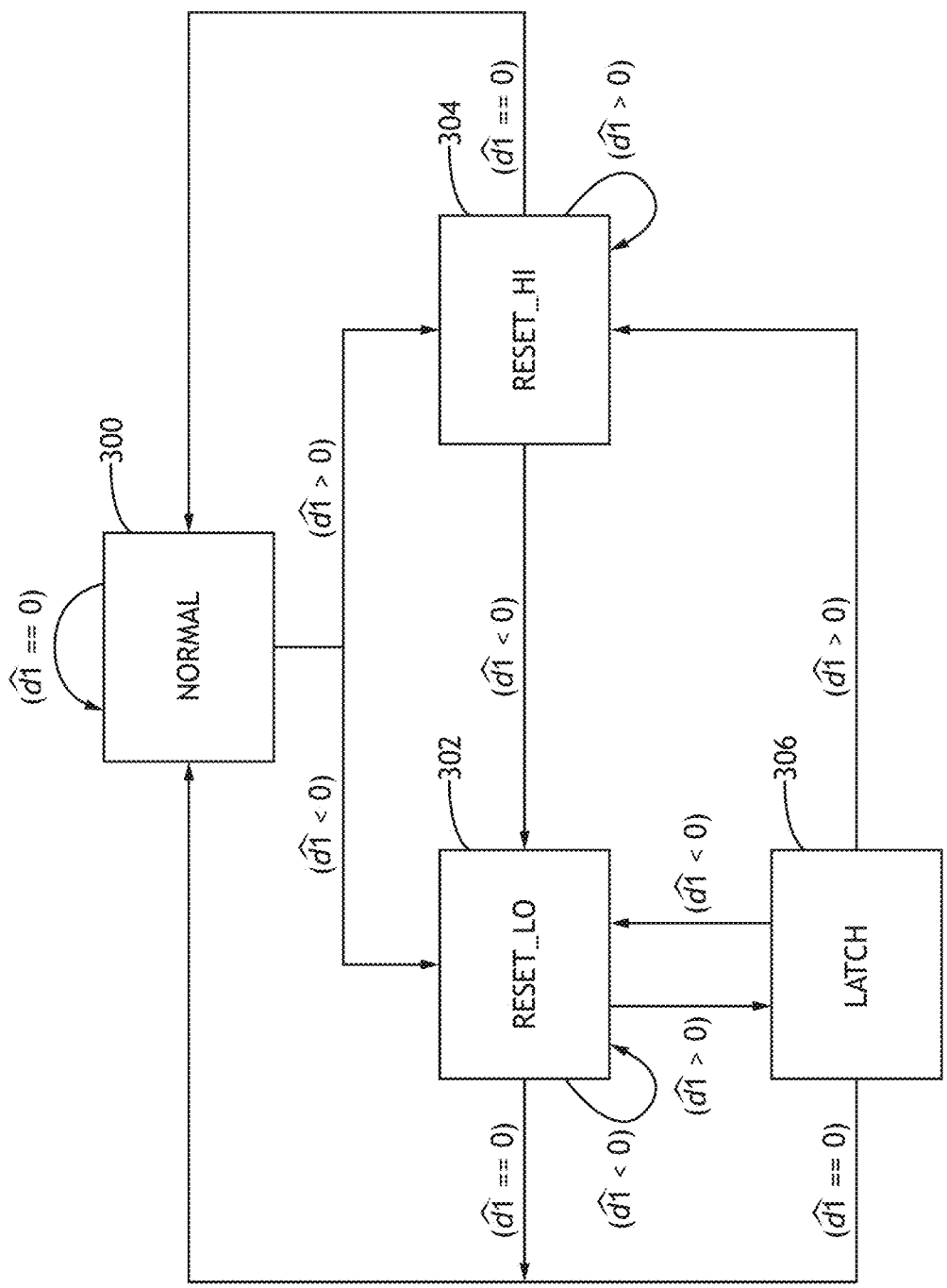
FIG. 3 shows a flowchart of a method according to an exemplary embodiment.

Referring to FIG. 3, a flowchart of a method according to an exemplary embodiment is shown. The initial state always begins as NORMAL 300. The pixel states transition based on the value of $\widetilde{d1_{x,y}}$ where exceedances of $\widetilde{d1_{x,y}} > 0$ or $\widetilde{d1_{x,y}} < 0$ transition the state on the frame they occur to RESET_HI 304 or RESET_LO 302 respectively. In at least one embodiment, the exception to this occurs for a pixel in the RESET_LO 302 state that exceeds a positive noise threshold on the current frame ($\widetilde{d1_{x,y}} > 0$), which indicates a single frame event has occurred (e.g. a single photon event). When this sequence of exceeding a negative noise threshold (being in the RESET_LO 302 state) followed by exceeding a positive noise threshold is detected, the current frame pixel state is set to LATCH 306 instead of RESET_HI 304.

In at least one embodiment, only the transition from RESET_LO 302 to the LATCH 306 pixel state signifies that a positive signal impulse greater than the noise threshold (e.g. a single photon event) has occurred in the detail signal. A negative impulse in the detail signal as defined by the transition from RESET_HI 304 to RESET_LO 302 is not indicative of a received photon and as such will not transition to the LATCH 306 state.

In at least one specific embodiment, pixel state values are mapped to the binary values by:
NORMAL 300 00
RESET_LO 302 01
RESET_HI 304 10
LATCH 306 11

It may be appreciated that discrete states described herein may be used to implement a single frame delay; additional pixel states may be necessary for embodiments having more than one frame delay. Prior to updating the pixel state value, the states from the previous frame or frames are read from a memory or storage device. The previous frames pixel state values are referred to as $prevPixelState_{x,y}$. Next, all pixels that exceed the denoising thresholds on the current frame are flagged by checking the values in $\widetilde{d1_{x,y}}$. A $pixelState_{x,y}$ matrix is updated by setting the pixel state to RESET_HI 304 when $\widetilde{d1_{x,y}}$ is greater than zero, and to RESET_LO 302 when $\widetilde{d1_{x,y}}$ is less than zero. This means that any location in the $\widetilde{d1_{x,y}}$ matrix where the value is greater than zero forces an update in the same x,y location in the pixel state matrix to a value of RESET_HI 304. The same logic applies to values of $\widetilde{d1_{x,y}}$ less than zero forcing a value of RESET_LO 302.

A LATCH 306 state is set for any pixels that were detected as having a single frame event. In at least one embodiment, this occurs when the previous pixel state ($prevPixelState_{x,y}$) is RESET_LO 304, and $\widetilde{d1_{x,y}}$ for the current frame is greater than zero.

It may be appreciated that the embodiment described herein is directed toward criteria for detecting a single frame photon event based on a specific wavelet function defined herein. Alternative embodiments are envisioned where the criteria for utilizing prior pixel data to detect a single frame photon event during a current frame denoising processes are different.

Figure 4:
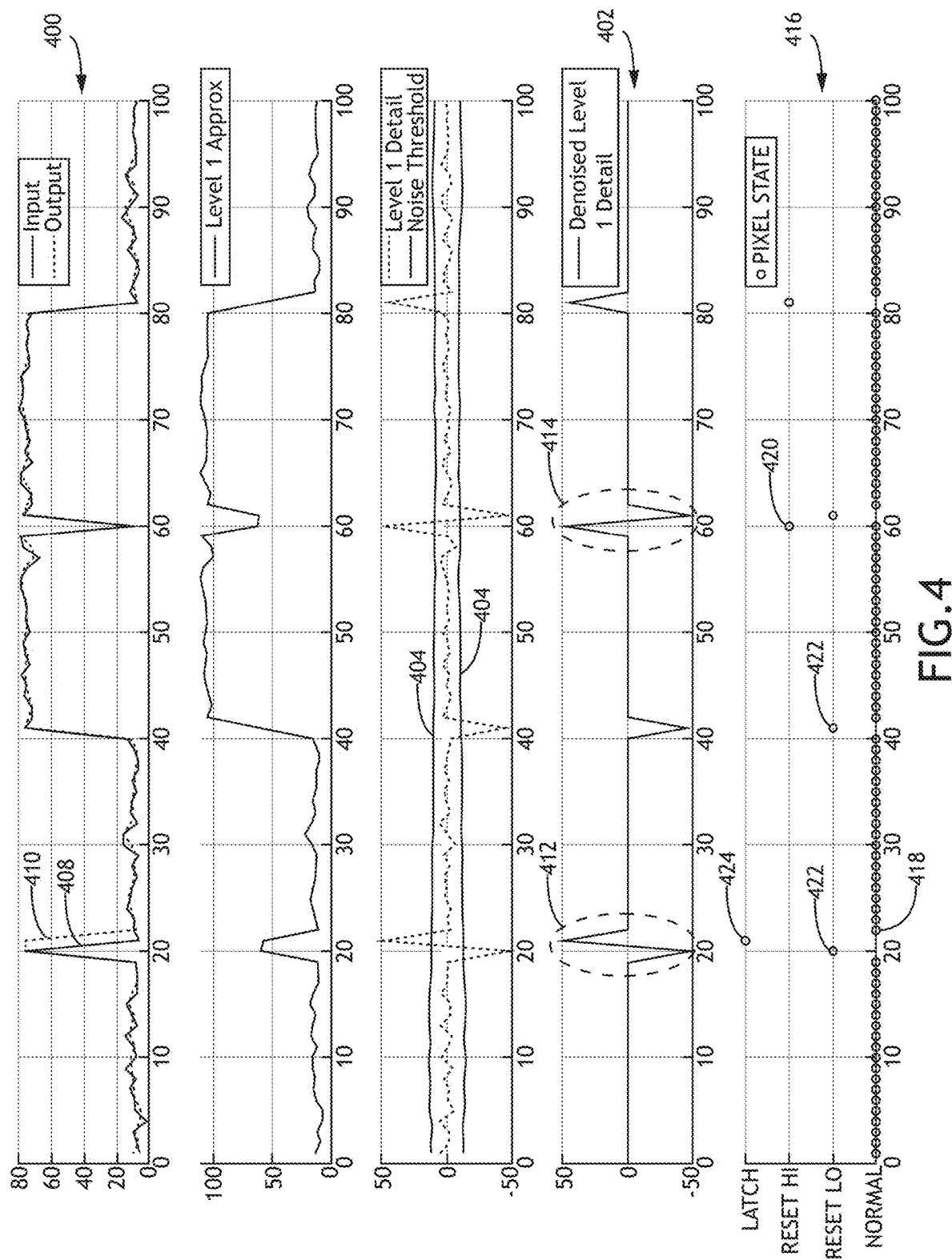
FIG. 4 shows graphs defining various processing steps during a method according an exemplary embodiment.

Referring to FIG. 4, graphs defining various processing steps during a method according to an exemplary embodiment is shown. A graph of image pixel stream signals 400 includes a single photon event 408 that is latched and extended to a multi-frame event output 410 via the processes described herein.

In at least one embodiment, a set of thresholds 404 are calculated from a noise estimate based on the detail signal $d1_{x,y}$. In at least one embodiment, only values of $d1_{x,y}$ that correspond to a pixel state of NORMAL are used to update noise thresholds 404 (i.e., only pixels that are identified as noise are used to update the noise estimates).

A single photon event 408, which is represented by an impulse and the black signal pixel value over time, now lasts twice as long in the output 410. In at least one embodiment, a negative impulse followed by a positive impulse 412 in the denoised detail signal $\widehat{d1_{x,y}}$ 402 produces such signal doubling in the output 410. By contrast, a positive impulse followed by a negative impulse 414 in the denoised detail signal $\widehat{d1_{x,y}}$ 402 would not produce signal doubling in the output 410.

Such logic is applied independently to all the pixels in the image. When a viewer observes the output image, the latching of single frame impulses creates more information for the viewer's visual system to integrate.

If the signal does not exceed a threshold 404, the system assumes the signal is noise. In at least one embodiment, the system calculates a standard deviation or a variance of this process in real time. For example, the system may calculate a mean absolute difference to estimate the standard deviation. Such thresholds 404 may be pixel specific. In at least one embodiment, a negative impulse followed by a positive impulse 412 in the denoised detail signal $\widehat{d1_{x,y}}$ 402 under low light conditions likely is a photon, resulting in a latch for that pixel.

A graph of pixel states 416 at discreet times illustrates that for any instance where the detail signal $d1_{x,y}$ is within the defined thresholds 404, the denoised detail signal $\widehat{d1_{x,y}}$ is zero and the pixel is in a NORMAL state 418. Where the pixel is in a NORMAL state and subsequently exceeds a high value threshold, the pixel is in a RESET_HI state 420. Where the pixel exceeds a low value threshold, the pixel is in a RESET_LO state 422. In at least one embodiment, only where the pixel is in a RESET_LO state 422, and on the next update experiences conditions that would otherwise result in a RESET_HI state, does the pixel enter the LATCH state 424.

It may be appreciated that the embodiment described herein is directed toward detecting a single frame photon event and utilizing previous pixel data in a two-frame wavelet denoising function. Other criteria may be utilized for identifying pixels to enter the LATCH state 424. Furthermore, embodiments are envisioned utilizing more than two frames. In such embodiments, additional or alternative criteria and/or processes may be required.

Embodiments of the present disclosure comprise a forward wavelet transform, transforming into the wavelet domain, which gives an approximation signal, and a detail signal, corresponding to a low frequency and high frequency breakdown.

The wavelet transform operates over samples and time. The system may add a delay in the output for two or more frames of data, and process them in such a way that the output corresponds to the most recent frame, not the older frame.

It is believed that the inventive concepts disclosed herein and many of their attendant advantages will be understood by the foregoing description of embodiments of the inventive concepts, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The forms herein before described being merely explanatory embodiments thereof, it is the intention of the following claims to encompass and include such changes. Furthermore, any of the features disclosed in relation to any of the individual embodiments may be incorporated into any other embodiment.

What is claimed is:

1. A computer apparatus comprising:
    at least one processor in data communication with a memory storing processor executable code for configuring the at least one processor to:
    receive an image stream;
    identify a single photon event in a frame of the image stream;
    associate the single photon event with a pixel;
    record the single photon event and pixel;
    flag the pixel state as LATCH; and
    calculate an inverse wavelet transform on the pixel flagged as LATCH using a pixel data corresponding to the single photon event.

2. The computer apparatus of claim 1, wherein the at least one processor is further configured to flag the pixel as RESET_LO.

3. The computer apparatus of claim 1, wherein the at least one processor is further configured to determine that the pixel would be flagged as RESET_HI.

4. The computer apparatus of claim 1, wherein:
    the at least one processor is further configured to determine a latch enable threshold and a latch disable threshold;
    the latch disable threshold is greater than the latch enable threshold; and
    the latch disable threshold and latch enable threshold are defined by light levels.

5. The computer apparatus of claim 1, wherein:
    the at least one processor is further configured to identify a threshold noise band; and
    identifying the single photon event comprises determining that a signal exceeds a lower noise threshold and then an upper noise threshold.

6. The computer apparatus of claim 4, wherein the at least one processor is further configured to:
    determine the threshold noise band with reference to a plurality of noise events in a detail signal over time.

7. The computer apparatus of claim 5, wherein determining the threshold noise band comprises determining a moving average of noise events.

8. A method for enhancing low light images comprising:
    receiving an image stream;
    identifying a single photon event in a frame of the image stream;
    associating the single photon event with a pixel;
    recording the single photon event and pixel;
    flagging the pixel state as LATCH; and
    calculating an inverse wavelet transform on the pixel flagged as LATCH using a pixel data corresponding to the single photon event.

9. The method of claim 8, further comprising flagging the pixel as RESET_LO.

10. The method of claim 8, further comprising determining that the pixel would be flagged as RESET_HI.

11. The method of claim 8, further comprising identifying a threshold noise band, wherein identifying the single photon event comprises determining that a signal exceeds a lower noise threshold and then an upper noise threshold.

12. The method of claim 11, further comprising:
    determining the threshold noise band with reference to a plurality of noise events in a detail signal over time.

13. The method of claim 12, wherein determining the threshold band comprises determining a moving average of noise events.

14. A system for enhancing low light images comprising:
   at least one camera; and
   at least one processor in data communication with the at least one camera and a memory storing processor executable code for configuring the at least one processor to:
      receive an image stream;
      identify a single photon event in a frame of the image stream;
      associate the single photon event with a pixel;
      record the single photon event and pixel;
      flag the pixel state as LATCH; and
      calculate an inverse wavelet transform on the pixel flagged as LATCH using a pixel data corresponding to the single photon event.

15. The system of claim 14, wherein the at least one processor is further configured to flag the pixel as RESET_LO.

16. The system of claim 14, wherein the at least one processor is further configured to determine that the pixel would be flagged as RESET_HI.

17. The system of claim 14, wherein:
   the at least one processor is further configured to determine a latch enable threshold and a latch disable threshold;
   the latch disable threshold is greater than the latch enable threshold; and
   the latch disable threshold and latch enable threshold are defined by light levels.

18. The system of claim 14, wherein:
   the at least one processor is further configured to identify a threshold noise band; and
   identifying the single photon event comprises determining that a signal exceeds a lower noise threshold and then an upper noise threshold.

19. The system of claim 18, wherein the at least one processor is further configured to:
   determine the threshold noise band with reference to a plurality of noise events in a detail signal over time.

20. The system of claim 19, wherein determining the threshold noise band comprises determining a moving average of noise events.

\* \* \* \* \*